(12) United States Patent
Nicodem et al.

(10) Patent No.: US 7,571,865 B2
(45) Date of Patent: Aug. 11, 2009

(54) WIRELESS TEMPERATURE CONTROL SYSTEM

(75) Inventors: Harry E. Nicodem, Richmond, IL (US); J. Steven Martin, McHenry, IL (US)

(73) Assignee: Tonerhead, Inc., McHenry, IL (US)

( * ) Notice: Subject to any disclaimer, the term of this patent is extended or adjusted under 35 U.S.C. 154(b) by 69 days.

(21) Appl. No.: 11/554,694

(22) Filed: Oct. 31, 2006

(65) Prior Publication Data

US 2008/0099568 A1    May 1, 2008

(51) Int. Cl.
*G05D 23/00* (2006.01)
*F24F 3/00* (2006.01)

(52) U.S. Cl. .......................................... 236/51; 165/209

(58) Field of Classification Search ................ 236/1 B, 236/1 C, 51, 94; 165/205, 209; 700/276, 700/277
See application file for complete search history.

(56) References Cited

U.S. PATENT DOCUMENTS

| | | | |
|---|---|---|---|
| 4,969,508 A | 11/1990 | Tate et al. | |
| 5,002,226 A | 3/1991 | Nelson | |
| 5,271,558 A | 12/1993 | Hampton | |
| 5,364,304 A | 11/1994 | Hampton | |
| 5,413,278 A | 5/1995 | Erickson | |
| 5,476,221 A | 12/1995 | Seymour | |
| 5,533,668 A | 7/1996 | Erickson | |
| 5,833,134 A | 11/1998 | Ho | |
| 5,839,654 A | 11/1998 | Weber | |
| 5,927,599 A | 7/1999 | Kath | |
| 6,261,087 B1 | 7/2001 | Bird et al. | |
| 6,394,359 B1 | 5/2002 | Morgan | |
| 6,513,723 B1 | 2/2003 | Mueller et al. | |
| 6,619,055 B1 | 9/2003 | Addy | |
| 6,622,925 B2 | 9/2003 | Carner et al. | |
| 6,933,655 B2 | 8/2005 | Morrison et al. | |
| 6,983,889 B2 | 1/2006 | Alles | |
| 6,997,390 B2 | 2/2006 | Alles | |
| 2003/0040279 A1 | 2/2003 | Ballweg | |
| 2003/0066897 A1 | 4/2003 | Carner et al. | |
| 2004/0124741 A1 | 7/2004 | Morrison et al. | |
| 2004/0182941 A1 | 9/2004 | Alles | |
| 2005/0040250 A1* | 2/2005 | Wruck | 236/51 |
| 2005/0116055 A1 | 6/2005 | Alles | |
| 2005/0194456 A1 | 9/2005 | Tessier et al. | |
| 2005/0195757 A1 | 9/2005 | Kidder et al. | |
| 2005/0215237 A1 | 9/2005 | Smyth et al. | |
| 2005/0270151 A1 | 12/2005 | Winick | |
| 2006/0032932 A1 | 2/2006 | Bartlett | |
| 2006/0097063 A1 | 5/2006 | Zeevi | |
| 2006/0131246 A1 | 6/2006 | Ehlers | |
| 2006/0131511 A1 | 6/2006 | Ehlers | |

* cited by examiner

*Primary Examiner*—Marc E Norman
(74) *Attorney, Agent, or Firm*—Valauskas & Pine LLC

(57) ABSTRACT

An apparatus such as a wireless temperature control system or a method for controlling an HVAC unit from a central location may include a control transmitter for sending programming data. One or more thermostats, each wired to an associated HVAC unit or units, have a wireless component for receiving the programming data from the control transmitter via a localized wireless network. The one or more thermostats of the system are not dependent upon the control transmitter or the localized wireless network for continued operation. Using this apparatus or method, a user may, among other things, transmit programming data to one or more HVAC units from one central location.

10 Claims, 4 Drawing Sheets

WIRELESS TEMPERATURE CONTROL SYSTEM

FIELD OF THE DISCLOSURE

The present apparatus and methods generally relate to a wireless temperature control system and a method which is used, for example, for controlling a heating, ventilation, and air conditioning ("HVAC") system over a localized wireless network from a central location, among other things.

BACKGROUND

Heating, ventilation, and air conditioning ("HVAC") units or systems are used to control climates within buildings. Furthermore, HVAC units may provide fresh air, may control humidity or odors, and may maintain pressure relationships between different spaces. These systems generally contain one or more thermostats wired to an HVAC unit and more recently include wireless thermostats. The systems also contain ductwork, such as air ducts and outlets, throughout a building to deliver air to the climate controlled areas of a building. Depending on factors such as the size of the building and desired climate control functionality, many buildings often contain more than one HVAC unit. If a user wishes to change the settings for an entire building in such cases, the user must change the settings for each HVAC unit by going from room to room or from area to area to change the settings on each different thermostat associated with each different HVAC system.

SUMMARY

One aspect of the claimed apparatus includes a control transmitter for sending programming data and a thermostat wired to an HVAC unit, the thermostat having a wireless component for receiving programming data from the control transmitter via a localized wireless network. Furthermore, according to one embodiment of the claimed apparatus, the thermostat is not dependent upon the control transmitter or the localized wireless network for it to continue to operate as desired.

Another embodiment of a wireless temperature control system also includes a second thermostat wired to a second HVAC unit, the second thermostat having a second wireless component for receiving programming data from the control transmitter for continued operation. Furthermore, according to this embodiment of the claimed apparatus, the thermostat is not dependent upon the control transmitter or the localized wireless network for it to continue to operate as desired.

Yet another embodiment of the claimed apparatus further includes a thermostat operably coupled to a second thermostat.

Another embodiment of a wireless temperature control system further includes a personal computer to provide programming data to the control transmitter.

Yet another embodiment of a wireless temperature control system further includes one or more wireless sensors operably coupled to a thermostat.

Another embodiment of the claimed apparatus further includes a control receiver that receives reporting data from a wireless component of a thermostat via a localized wireless network. In yet another embodiment of the claimed apparatus, one or more wireless sensors transmit sensor data via a localized wireless network to a control receiver.

Another embodiment of a wireless temperature control system may also include a thermostat storing programming data in a nonvoliatile memory.

In still another embodiment of the claimed apparatus, a wireless temperature control system may include one or more override buttons such that a user may override programming data.

A method for controlling an HVAC unit from a central location includes transmitting programming data via a localized wireless network; receiving the programming data with a thermostat wired to an HVAC unit having a wireless component; and using the programming data for the operation of the HVAC unit. The method may also include entering the programming data into a personal computer.

In another embodiment, a method for controlling an HVAC unit from a central location may additionally include a second thermostat wired to a second HVAC unit having a second wireless component that also receives programming data. This embodiment of the method may also include transmitting thermostat data from the thermostat to the second thermostat.

The method for controlling an HVAC unit from a central location may also include using one or more wireless sensors to generate sensing data, transmitting the sensing data from the wireless sensors via a localized wireless network, and receiving the sensing data with a thermostat. In yet another embodiment of this method, the method may include sensing data with a control receiver.

A method for controlling an HVAC unit from a central location may also include receiving reporting data from a thermostat with a control receiver via a localized wireless network.

In yet another embodiment, a method for controlling an HVAC unit from a central location may also include storing programming data in a nonvolatile memory.

A method for controlling an HVAC unit from a central location may also include overriding programming data with one or more override buttons.

DETAILED DESCRIPTION

The present apparatus and method generally relate to programming an array of thermostats for heating, ventilation, and air conditioning ("HVAC") units or systems from a central location. The following detailed description is of example embodiments of the presently claimed apparatus and method with references to the accompanying drawings. Such description is intended to be illustrative and not limiting with respect to the scope of the present apparatus and method. Such embodiments are described in sufficient detail to enable one of ordinary skill in the art to practice the subject apparatus and method, and it will be understood that other embodiments may be practiced without departing from the spirit and scope of the embodiments described herein.

Figure 1:
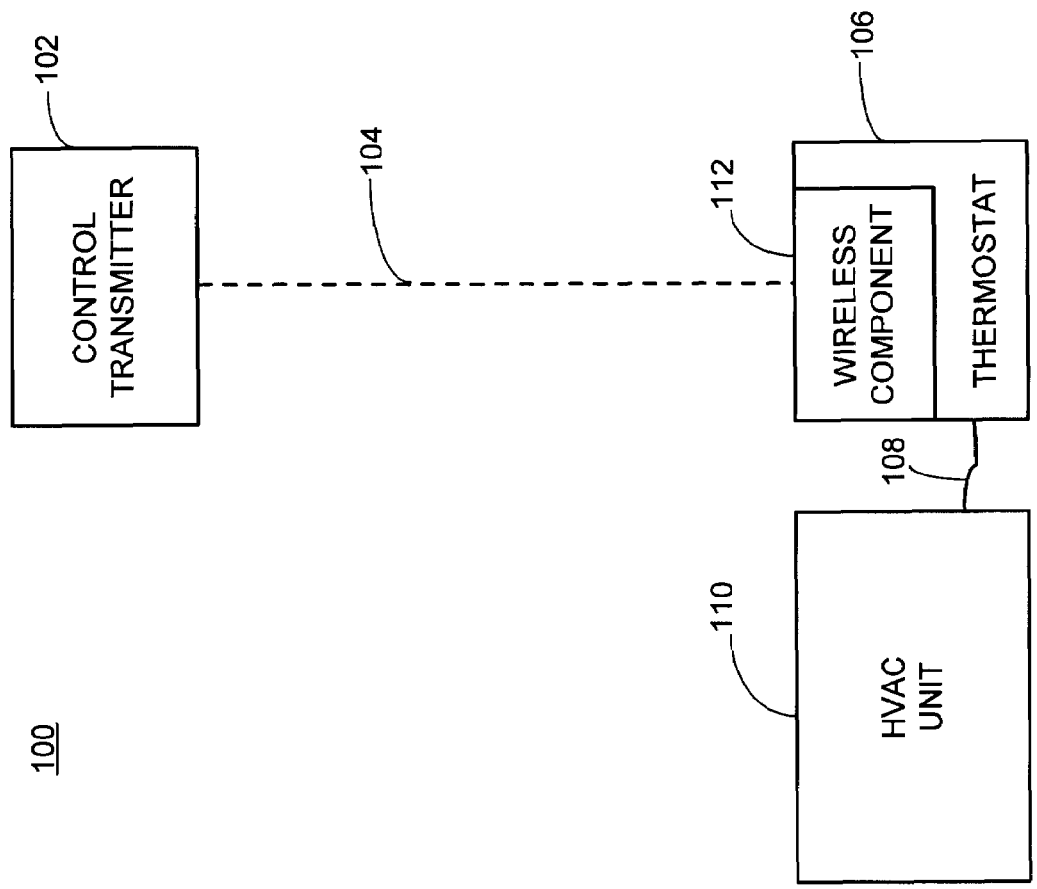
FIG. 1 is a wireless temperature control system.

FIG. 1 shows one embodiment of a wireless temperature control system 100. In this embodiment, a control transmitter 102 sends programming data via a localized wireless network 104. The control transmitter 102, as one skilled in the art will appreciate, is a device that utilizes the radio frequency ("RF")

spectrum for communicating with other devices. Accordingly, the control transmitter may contain, among other things, an antenna, possibly internal or external; and a power source, which as one skilled in the art may appreciate, could be a battery, an AC current source; a computer via a USB connection, or any other suitable power supply now known or later developed.

The control transmitter 102 may transmit or send data, such as programming data, over a wireless network 104, which may be a localized wireless network. The wireless network 104 may be any suitable wireless network as known to one skilled in the art. For example, it may be based on the IEE 802.11 standards (the "Wi-Fi" standard); the IEE 802.15.1 standard ("Bluetooth"), the IEE 802.15.4 standard ("ZigBee"), or any other suitable network now known or later developed. As those skilled in the art will appreciate, however, the ZigBee specification is intended to yield simpler, cheaper, and more power-efficient devices. It is further understood that one of ordinary skill in the art would appreciate how the different components utilizing the localized wireless network 104 communicate and successfully transmit data. For example, depending on the protocol used, each thermostat's wireless component 112 may be assigned a unique serial number to distinguish it from other devices using the localized area network 104. Further note that the localized wireless network 104 is not directed point-to-point as the figures may suggest. Instead, the lines depicting the localized area network 104 are shown in the figures only to help one understand how some of the components could be operably connected via the localized wireless network 104. Thus, the shown operable connections may not be the only operable connections in the system.

A thermostat 106 wired 108 to an HVAC unit 110 contains a wireless component 112 for receiving data from the control transmitter 102. The data may include, for example, programming data. As one skilled in the art will appreciate, this programming data may include set points, time periods, and other settings for a thermostat 106. This programming data may be associated with only one thermostat 106 or with more than one thermostat, as discussed below. Additionally, note that the wireless component 112 of the thermostat 106 may include a transmitter, a receiver, an antenna, a power source, and any other suitable components necessary for transmitting and/or receiving data over a wireless network 104. It is to be understood that the wireless component may contain different components depending upon its function in the chosen embodiment. For example, in an embodiment where the thermostat only receives data, the wireless component may or may not include a transmitter because only a receiver (and other necessary components for receiving, such as a power source and an antenna) is necessary. Alternatively, for example, if the thermostat both receives data and transmits data, as discussed below in other embodiments, the wireless component 112 may also include a transmitter. It should be further understood that although this wireless component 112 is depicted as part of the thermostat 106, the wireless component may be in any suitable location, which, for example, may be operably connected to, but not included within, the thermostat 106 itself.

As already noted, the thermostat 106 is wired 108 to an HVAC unit 110. As one skilled in the art will appreciate, the thermostat 106 may actually communicate with the HVAC unit 110 via wireless means, thereby eliminating the need for the depicted wires 108. In this particular embodiment, however, the thermostat 106 is wired 108 to the HVAC unit 110 such that, if so desired, one may implement the described apparatus or method by replacing a traditional thermostat wired 108 to an HVAC unit 110 with a thermostat 106 having a wireless component 112.

The thermostat 106 contains all the functionality and operations of a normal thermostat. Therefore, for example, a user may be able to view current set points, view current temperatures, change current set points, view time periods, change time periods, enter a temporary mode of operation, and, among other things, resume a programmed mode of operation based on predefined or default set points. The thermostat 106 may also include a temperature sensor, a temperature indicator, a humidity sensor, relays to control single or dual stage HVAC units, run indicators (LEDs or equivalents, for example), and other features as one skilled in the art would appreciate. The thermostat 106 could be powered by replaceable batteries, rechargeable batteries using the 24-volt AC typically found in an HVAC unit 110 to recharge the batteries, or a high capacity capacitor using the 24-volt AC to charge the capacitor. The HVAC unit 110 is a heating, ventilation, and air conditioning unit as commonly known and appreciated by one of ordinary skill in the art.

It should be understood that in this embodiment, the thermostat 106 is not dependent upon the control transmitter 102 or the localized wireless network 104 for continued operation. This means, for example, that a user could install the thermostat 106 having a wireless component 112 and never implement a localized wireless network 104 for the HVAC unit 110 to operate. Alternatively, a user may use a control transmitter 102 and a localized wireless network 104 to send programming data to the thermostat 106 and then remove the control transmitter 102 and localized wireless network 104. In such a case, the thermostat 106 and HVAC unit 110 will continue to function based on the set points, time periods, and other information contained in the programming data. The user could, however, use the thermostat 106 to program different set points, time periods, and other data to control the functionality of the HVAC unit 110.

Figure 2:
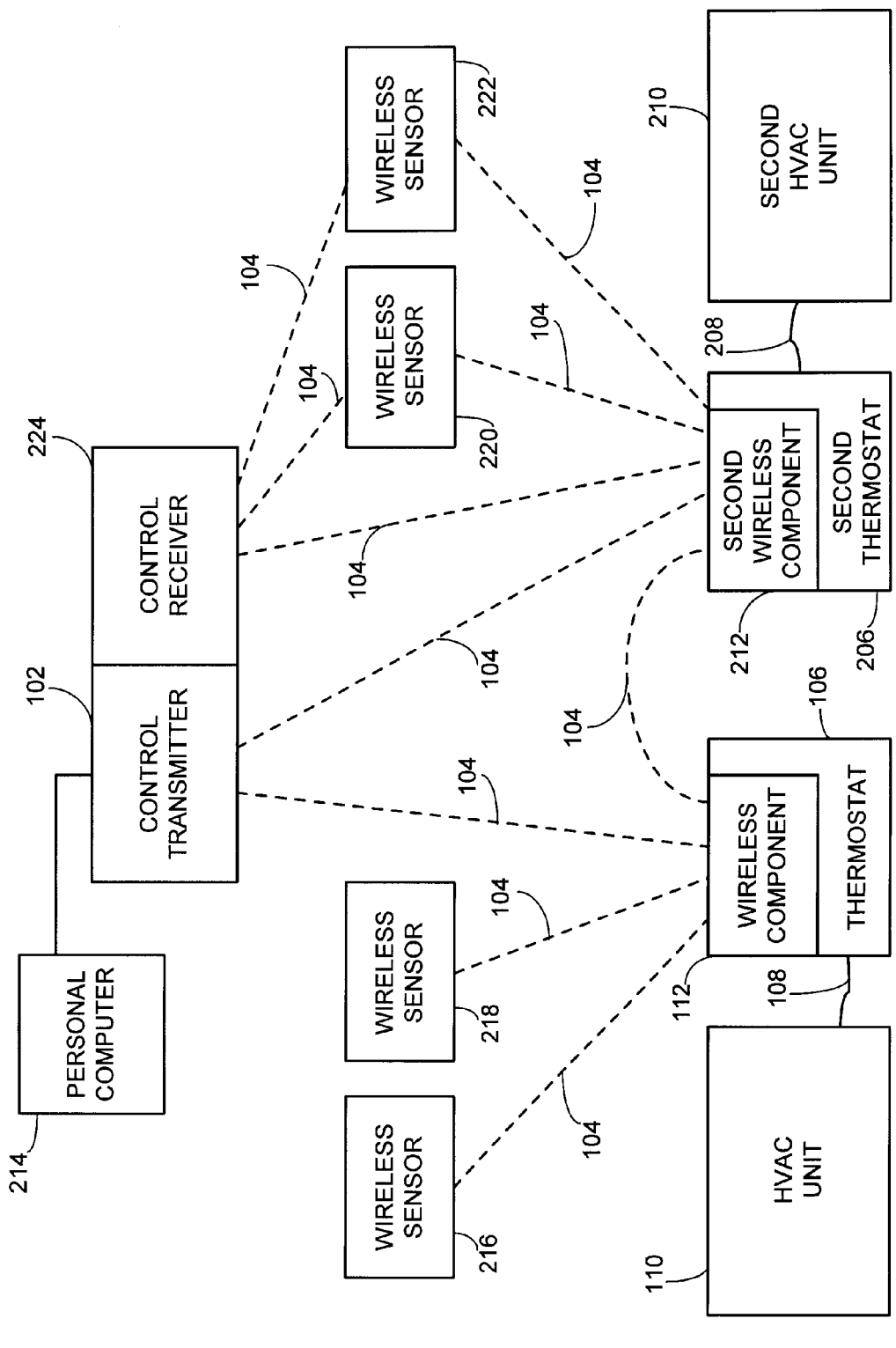
FIG. 2 is another wireless temperature control system including additional example devices in the system.

Turning now to FIG. 2, another embodiment of a wireless temperature control system 200 is shown. Similar to FIG. 1, this embodiment includes a control transmitter 102, a localized wireless network 104, a thermostat 106 having a wireless component 112, and an HVAC unit 110 that is wired 108 to the thermostat 106. As one of ordinary skill in the art will appreciate, the additional components illustrated in FIG. 2 may be added collectively or individually, either now or at a time in the future. That is, different components with different functionality may be added at different times depending on the desired functionality, all while maintaining the present spirit and scope of the device as illustrated and described. Furthermore, although FIG. 2 contains several components with the same reference numbers, the components may be more or less complex than those illustrated in FIG. 1, again, dependent upon desired functionality of the system.

For example, FIG. 2, among other things, shows the control transmitter 102 operably coupled via the localized wireless network 104 to a second thermostat 206 having a second wireless component 212. The second thermostat 206 is wired 208 to a second HVAC unit 210. This second thermostat 206, second wireless component 212, and second HVAC unit 210 function similarly to the thermostat 106, wireless component 112, and HVAC unit 110, as described above. For example, the second wireless component 212 may receive data, such as programming data, from the control transmitter 102 via the localized wireless network 104 for continued operation. Also similarly, the second thermostat 206 is not dependent upon the control transmitter 102 or the localized wireless network 104, as further described above in relation to thermostat 106.

One optional feature of this embodiment is that thermostat 106, by using the wireless component 112, and second thermostat 206, by using the second wireless component 212, may optionally be operably coupled to each other via the localized wireless network 104. As one of ordinary skill in the art will appreciate, this feature may allow data sharing and more complex logic such that, among other things, HVAC unit 110 and second HVAC unit 210 may operate based on the operating state of or other data from the other HVAC unit. As yet another example, the sharing of data may allow one thermostat to update another thermostat with more current data, such as set points, if, for example, the other thermostat was unable to receive programming data at the time the control transmitter 102 sent it. It is readily apparent to one of ordinary skill in the art that in order for thermostat 106 to be operably coupled to second thermostat 206 via the localized wireless network 104 that the wireless component 112 and second wireless component 212 must contain not only a receiver, but also a transmitter. Furthermore, as one of ordinary skill in the art would appreciate, the wireless temperature control system 200 could include several additional HVAC units and thermostats, limited only to the capacity of the controlled environment and the capabilities of the localized wireless network.

Yet another optional feature of the system 200 is a personal computer 214, used for, among other things, providing data, such as programming data, to the control transmitter 102. Personal computer 214 may be located in a central location. Note that "central location" does not mean that the location must be central in relation to other components of the apparatus or system. Instead, "central location" is used to describe that instead of needing to go to several locations to control multiple HVAC units, a user may go to one, i.e., central, location to control one or more HVAC systems. Furthermore, a system may even contain more than one "central locations." As one skilled in the art will appreciate, the computer may include a processor coupled to a memory component that stores at least one application. The personal computer 214 may comprise virtually any type of computing platform, including, but not limited to, a desktop personal computer, a laptop computer, a handheld computer, a digital assistant, or a computer-equipped kiosk. In yet another embodiment, the personal computer 214 may be embodied in a phone or the like. As one of ordinary skill in the art will recognize, the processor may be any conventional microprocessor, microcontroller, digital signal processor, or combinations thereof or the like that are capable of executing instructions stored in memory. The memory may comprise any combination of volatile or non-volatile memory known in the art. The memory comprises one or more applications which typically comprise stored instructions capable of execution by the processor.

The personal computer 214, in the context of this device, provides data, such as programming data, to the control transmitter 102. The personal computer 214 may be operably connected to the control transmitter 102 in any number of ways as known by one of ordinary skill in the art. For example, a Universal Serial Bus ("USB") interface may be used; a Firewire (IEEE 1394) interface may be used; a wireless network may be used; an RS-232 serial interface may be used; or any other suitable means now known or later developed may be used to provide data to the control transmitter 102.

For example, a user may input data into a personal computer 214 via a control program. The user may input set points and time periods into the control program's user interface for all thermostats in a system. The data may optionally be stored in a database. After the user enters all data, the control program may provide the programming data to the control transmitter so the control transmitter may transmit the data, such as programming data, to one or more components, such as thermostats, in the system, which could include thermostats operating separate, independent HVAC units. Since all HVAC units and associated thermostats may operate independently of the localized wireless network 104, the control transmitter 102, and the personal computer 214, any or all of these may be shut down and the HVAC units, such as HVAC units 110 and 210 may continue to operate and function, i.e., they operate autonomously. If desired, however, the personal computer 214 and other components may remain in operation for system monitoring, as discussed below.

Another optional feature of the shown embodiment includes one or more wireless sensors 216, 218, 220, and 222. It should be understood that there may be more or fewer wireless sensors than those shown, and it is a matter of preference and desired functionality, as understood by one of ordinary skill in the art, as to how many wireless sensors to use, if any at all, and what function they serve in the system. These wireless sensors 216, 218, 220, and 222, as known to one of ordinary skill in the art, may measure, among other things, air temperatures, such as outside air temperatures, room temperatures, and/or air duct temperatures. Wireless sensors 216, 218, 220, and 222 may also be able to measure other environmental characteristics, such as humidity. Somewhat similarly, the system may also include controllers, such as wireless controllers, that may control components of the system, such as fans, dampers, or other components of the system as known to one of ordinary skill in the art.

Wireless sensors 216, 218, 220, and 222 may be operably coupled to a thermostat, for example, via the localized wireless network 104. As shown in FIG. 2, for example, wireless sensors 216 and 218 are operably connected to thermostat 106 via localized wireless network 104 and wireless component 112. Similarly, wireless sensors 220 and 222 are operably connected to second thermostat 206 via localized wireless network 104 and second wireless component 212. As one or ordinary skill in the art will appreciate, wireless sensors 216, 218, 220, and 222 may report, for example, an outside air temperature so that a thermostat and HVAC unit may adjust operation based upon programming data or other incorporated logic.

Yet another optional feature of the embodiment shown in FIG. 2 is a control receiver 224. In FIG. 2, control receiver 224 is shown connected to control transmitter 102. While a control receiver 224 may be combined with a control transmitter 102, perhaps to form a transceiver, it should be understood that a control receiver 224 may be separate and independent of the control transmitter 102.

A control receiver 224 may receive data from different components of the system. For example, control receiver 224 may receive reporting data from a wireless component 112, 212 of a thermostat 106, 206 via a localized wireless network 104. Reporting data may include, among other things, data related to the current set points, a history of temperature readings, humidity readings, system operation times, override data, or other information commonly associated with HVAC units. This data may be obtained, for example, by the thermostat itself or by additional components, such as wireless or wired sensors now known or later developed. Such reporting data may be used by a personal computer 214 to log data or to, perhaps, make system adjustments by sending new data to the control transmitter 102 to send to different components of the system 200. Alternatively, it should be understood that these functions may be accomplished with components known to one of ordinary skill in the art other than a personal computer 214. It should also be understood that this feature of the system is expandable under the principles known to one of ordinary skill in the art and as further described throughout. For example, FIG. 2 does not show wireless component 112 operably coupled to control receiver 224 via the localized wireless network 104. As one of ordinary skill in the art will appreciate, however, this feature could easily be added to the system 200 as described within.

The control receiver 224 may also receive data, such as sensor data, from wireless sensors 220, 222 via localized wireless network 104. Similar to the reporting data, the control receiver 224 may use sensor data and send it to a personal computer 214 to log the data or to, perhaps, make system adjustments by sending new data to the control transmitter 102 to send to different components of the system 200. It should also be understood that this feature of the system is expandable under the principles known to one of ordinary skill in the art and as further described throughout. For example, FIG. 2 does not depict wireless sensors 216 or 218 transmitting or sending data, such as reporting data, to control receiver 224. As one of ordinary skill in the art will appreciate, however, this functionality could be added to the system 200. It is further understood, among other things, that other components may transmit and/or receive data from other components via the localized wireless network 104 or through wired connections. For example, it is possible for wireless sensor 216 to transmit and/or receive data to/from wireless sensor 222 (not shown).

As one of ordinary skill in the art will further appreciate, thermostats 106 and 206 may store data, such as programming data, in a nonvolatile memory. Non-volatile memory may include, for example, read-only memory (ROM), programmable memory (PROM), erasable PROMs (EPROM), electrically erasable PROM (EEPROM), flash memory, magnetic storage devices (e.g., hard disks, floppy disks, magnetic tape), optical disc drives, or any other suitable non-volatile memory now known or later developed.

Still yet another optional feature of a system 200 are override buttons (not shown). Override buttons are buttons that allow a user to override, permanently or temporarily, programming data in a thermostat. For example, in system 200, a thermostat 106 may have programming data stored in nonvolatile memory that keeps a room or portion of a building at one predetermined temperature that is ideal for the normal use of that room or portion of the building. A user may temporarily (or permanently) change the use of that room, thereby needing to change the programming data temporarily without wanting to go to the personal computer 214 located in another room or another portion of the building—maybe even in a different building entirely. This feature is further beneficial in a system 200 in which the personal computer 214 and/or control transmitter 102 and/or localized wireless network 104 is not in operation at the time of the desired change. The user may thus use the override button or buttons on a thermostat, such as thermostat 106 or 206, to make desired changes to data, such as programming data. The override buttons may be buttons similar to buttons found on traditional thermostat systems or they may be independent of the thermostat systems and send data to the thermostats when a user uses them. The override buttons may, for example, be based on an LCD interface or may be of any other suitable type commonly found on thermostats.

Override data may be programmed by the user at the time he or she uses the override buttons or the override buttons may transition the system to a pre-programmed override state. A pre-programmed override state may be a default setting within a thermostat, may be programmed at an earlier time via the thermostat, or may be programmed into the thermostat via programming data from control transmitter 102. For example, a thermostat may be operating based on programming data that causes the system to keep an unoccupied room at 65° F. A user may desire to use the room for three days, so the user may use override button(s) to cause the system to keep the room at 72° F. for three days. Alternatively, the user may put the system in an override state such that the system goes into a pre-programmed mode, such as an "occupied state," which has preset data that causes the system to keep a room at, for example, 72° F.

Furthermore, the time period for the override state may be pre-programmed, may be programmed at the time of use, or may be determined based on any other suitable means as one of ordinary skill in the art will appreciate. For example, a system may be programmed such that if the programming data is overridden by an override button, the system is to restore the original programming data in a set time, such as three hours, or at a set time, such as at 11:59 PM the day the override button was activated. As one or ordinary skill in the art will appreciate, the override buttons described herein may be used in multiple ways to achieve the desired affect and functionality—all within the spirit and scope of this system and method described within.

It is understood that in one embodiment, the components of a wireless temperature control system 100 or 200 may operate based on data, such as programming data, initially provided by a control transmitter 102. As such, override data interrupts or overrides the system's normal operating state. In yet another embodiment, for example, a control transmitter 120 may transmit data or other information via a localized wireless network 104 to cause a thermostat, such as thermostat 106 or 206, to resume normal operation or to begin operating based on new data, such as programming data. Thus, a control transmitter 102 may cause an HVAC unit 110 to ignore override data or reset an HVAC unit while disregarding override data. Furthermore, it is also contemplated that even in systems that contain override buttons or the like, a user may use a control transmitter 102 to set restrictions on if and when such override buttons may be used to override programming data.

Figure 3:
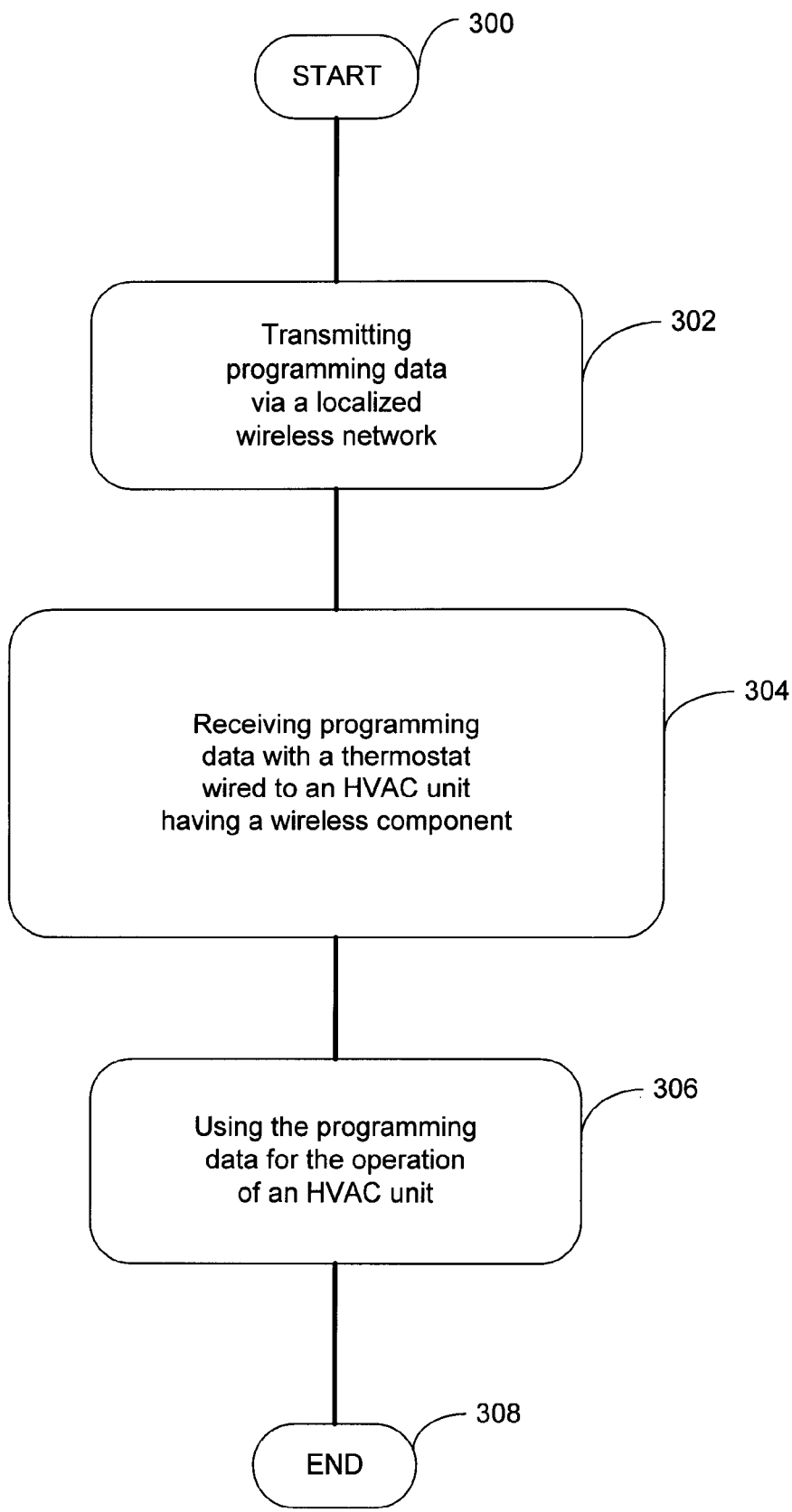
FIG. 3 shows a block diagram of a method for controlling an HVAC unit from a central location.

Turning now to FIG. 3, a method of controlling an HVAC unit from a central location is shown. An understanding of the devices described above will help one skilled in the art to understand the methods now disclosed. The method may be carried out by devices described herein or with any other suitable device or devices. The method starts as shown in block 300. As shown in block 302, the method includes transmitting programming data via a localized wireless network. In block 304, the method includes receiving programming data with a thermostat wired to an HVAC unit having a wireless component. Next, as shown in block 306, the method further includes using the programming data for the operation of the HVAC unit. Finally, the method ends at block 308.

Figure 4:
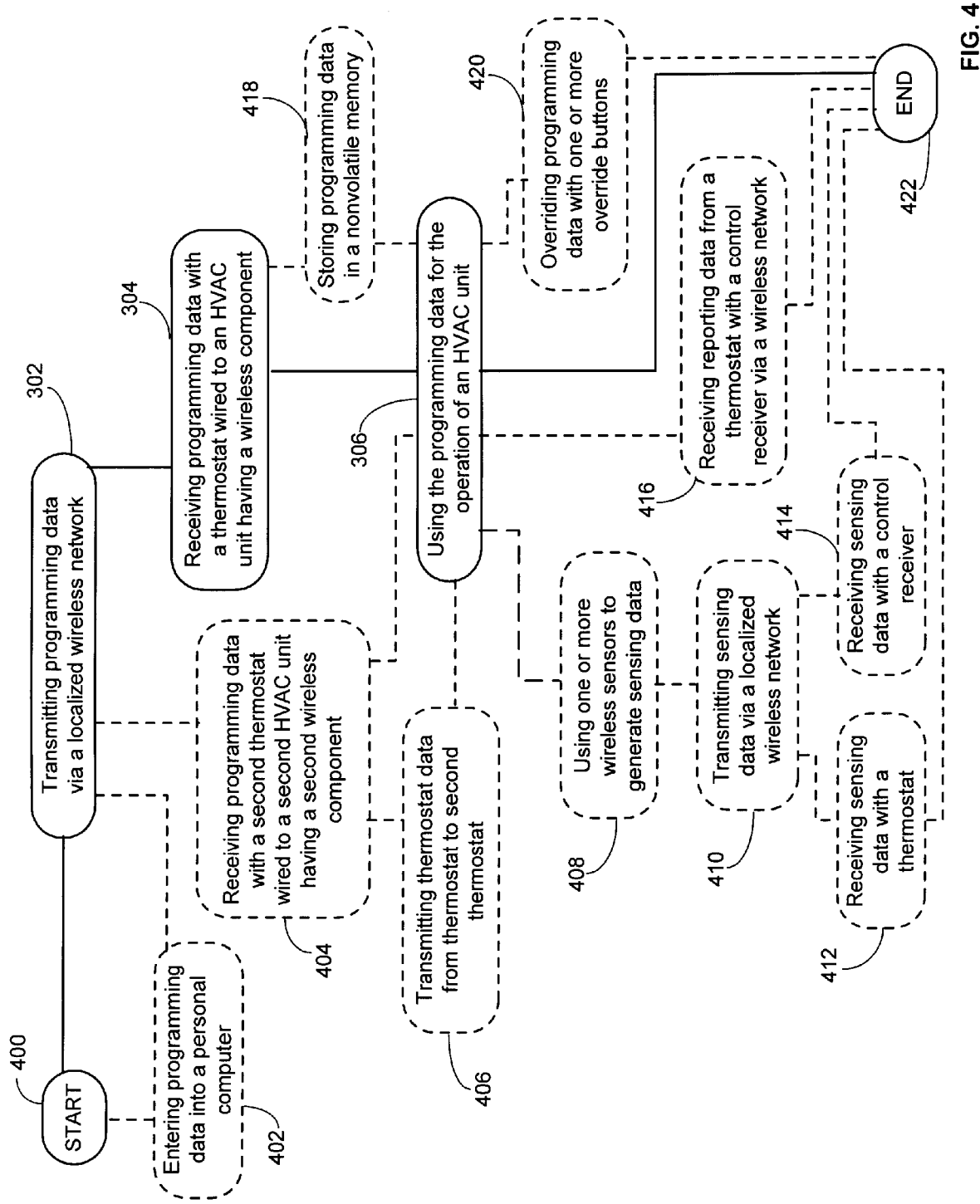
FIG. 4 shows a block diagram of a method for controlling an HVAC unit from a central location including additional, optional steps.

As one skilled in the art will appreciate, the described method may include additional steps before, between, or after any of the above-described steps. Some examples of additional embodiments of this method are shown in FIG. 4. FIG. 4 shows the method starting at block 400 and including the steps of FIG. 3, labeled block 302, 304, and 306. Additional, optional, steps are then shown in dotted lines. For example, block 402 shows that the method may include entering programming data into a personal computer before the programming data is transmitted via a localized wireless network.

This step may be useful in some contexts, but it may not be required. For example, the data may come from another source, such as a memory, before being transmitted over a localized wireless network.

Block 404 illustrates another embodiment of the described method. Block 404 shows the method may include receiving programming data with a second thermostat wired to a second HVAC unit having a second wireless component. It should be understood that since a second thermostat is involved here, this step may occur before, after, or at the same time as the step shown in block 304. For example, a device may transmit data that either a thermostat or a second thermostat receives, or a device may transmit data that both a thermostat and a second thermostat receive. Next, the method may include transmitting thermostat data from a thermostat to the second thermostat or to several additional thermostats, as shown in block 406. The method may continue, for example, by then using the programming data for the operation of an HVAC unit, shown in block 306.

Another optional step in a method for controlling an HVAC unit from a central location may involve using one or more wireless sensors to generate sensing data, as shown in block 408. Shown in block 410, the next step of the method may involve transmitting the sensing data via a localized wireless network. Next, the method may involve receiving the sensing data with a thermostat, shown in block 412, or may involve receiving the sensing data with a control receiver, shown in step 414. All of these steps may be carried out with the devices described above or with any other suitable devices as known to one of ordinary skill in the art.

Yet another optional step of the described method is receiving reporting data from a thermostat with a control receiver via a wireless network, shown in block 416. As discussed above with one suitable apparatus, one skilled in the art will appreciate the additional functionality that this step may add to the method.

A method for controlling an HVAC unit from a central location may further include storing programming data in a nonvolatile memory, shown in block 418. As one skilled in the art will appreciate, this step may occur, for example, after receiving programming data with a second receiver.

Another embodiment of the described method may include overriding programming data with one or more override buttons, shown in block 420, the functionality of which a user may accomplish by using, for example, the devices described above.

It should be understood that before the method ends (block 422), the steps may occur in a different sequence than shown in FIG. 4, as one skilled in the art will appreciate. For example, using one or more wireless sensors to generate sensing data, shown in block 408, may occur after the start, block 400. Furthermore, the additional steps do not need to be performed in order to transmit sensing data via a localized wireless network (block 410) and receiving the sensing data with either a thermostat (block 412) or a control receiver (block 414). As yet another example, receiving programming data from a thermostat with a control receiver via a wireless network, shown in block 416, may occur in almost any order, such as before the step shown in block 302 or immediately after the step shown in block 302. Thus, the order of the steps shown in FIG. 4 is only for illustrative purposes and is not limited to the order shown. One skilled in the art will appreciate and understand that some steps of this method may be done in a different order and that other steps, not shown or described, may also be incorporated into the described method without detracting from the method's spirit or scope.

The above detailed description of the devices and methods and the examples described herein have been presented for the purposes of illustration and description and other variations will be recognized by those in the art. For example, as one skilled in the art may recognize, a number of localized wireless networks may be suitable, whether such localized wireless network is now known or based on standards later developed. Furthermore, as used throughout, a device may mean a single device or plurality of devices, which may include any suitable structure or plurality of structures to implement the devices and methods recognized herein. Furthermore, it should be understood that although the given examples show independent parts within one device, the parts may appear in any form, such as being physically separated and connected through a computer network or by being further integrated into one system or device. For example, the control transmitter may be integrated into a personal computer or the like. Many other variations will also be recognized for the wireless sensor apparatus and methods.

It is therefore contemplated that the present invention cover any and all modifications, variations or equivalents that fall within the spirit and scope of the basic underlying principles disclosed above and claimed herein.

What is claimed is:

1. A temperature control system, comprising:
   a control unit for transmitting and receiving a first and second programming data;
   a first thermostat coupled to a first HVAC unit, said first thermostat having a component for transmitting and receiving said first programming data to or from said control unit via a localized network;
   wherein said first thermostat is not dependent upon said control unit for continued operation of said first HVAC unit;
   a second thermostat coupled to a second HVAC unit, said second thermostat having a second component for transmitting and receiving said second programming data to and from said control unit via a localized network;
   wherein said second thermostat is not dependent upon said control unit for continued operation of said second HVAC unit; and
   wherein said first thermostat is operably coupled to said second thermostat, such that said second HVAC unit may be controlled by said first thermostat based on said first programming data transmitted from said first thermostat, if said second thermostat were to malfunction, or to conserve energy of the temperature control system.

2. The temperature control system of claim 1 wherein a personal computer transmits said first and second programming data to said control unit.

3. The temperature control system of claim 1, further comprising one or more sensors operably coupled to said first thermostat.

4. The temperature control system of claim 1, further comprising one or more sensors operably coupled to said second thermostat 5. The temperature control system of claim 1, wherein said first thermostat transmits a sensor data to said control unit.

6. The temperature control system of claim 1, wherein said second HVAC unit is controlled by said control unit based on said sensor data received from said first thermostat.

7. The temperature control system of claim 1, further comprising at least one override button or said first thermostat such that a user may override said sensor data thereby controlling said second HVAC unit.

8. A method for controlling a second HVAC unit coupled to a second thermostat from a first thermostat coupled to a first HVAC unit if said second thermostat malfunctions or to conserve energy in a temperature control system, the method comprising the steps of:
   acquiring sensor data in said first thermostat:
   transmitting said sensor data to a control unit;
   receiving said sensor data by said control unit;
   transmitting said sensor data from said control unit to said second thermostat; and
   controlling said second HVAC unit based on said sensor data received by said second thermostat.

9. The method of claim 8 further comprising the steps of:
   using one or more sensors to generate sensor data;
   transmitting said sensor data from said one or more sensors to said first thermostat; and
   receiving said sensor data by said first thermostat.

10. The method of claim 8 further comprising the step of overriding said sensor data with at least one override button located on said first thermostat, wherein said user controls said second HVAC unit by pressing said at least one override button on said first thermostat.

* * * * *

UNITED STATES PATENT AND TRADEMARK OFFICE
CERTIFICATE OF CORRECTION

PATENT NO. : 7,571,865 B2
APPLICATION NO. : 11/554694
DATED : August 11, 2009
INVENTOR(S) : Harry E. Nicodem and J. Steven Martin It is certified that error appears in the above-identified patent and that said Letters Patent is hereby corrected as shown below:

Claim 4, Col. 10, ln. 58, after "thermostat", insert --.--;
Claim 8, Col. 11, ln. 6, after "thermostat", delete ":" and insert --;--.

Signed and Sealed this

Eighth Day of December, 2009

David J. Kappos
*Director of the United States Patent and Trademark Office*